(12) United States Patent
Scott et al.

(10) Patent No.: US 10,791,139 B2
(45) Date of Patent: Sep. 29, 2020

(54) CYBER SECURITY RISK MODEL AND INDEX

(71) Applicant: American Bureau of Shipping, Houston, TX (US)

(72) Inventors: Richard G. Scott, Red Rock, TX (US); Cris Owen DeWitt, Austin, TX (US); Matthew Mowrer, Knoxville, TN (US)

(73) Assignee: American Bureau of Shipping, Spring, TX (US)

( * ) Notice: Subject to any disclaimer, the term of this patent is extended or adjusted under 35 U.S.C. 154(b) by 34 days.

(21) Appl. No.: 16/169,548

(22) Filed: Oct. 24, 2018

(65) Prior Publication Data

US 2020/0137101 A1 Apr. 30, 2020

(51) Int. Cl.

| | | |
|---|---|---|
| G06F 11/00 | (2006.01) |
| G06F 12/14 | (2006.01) |
| G06F 12/16 | (2006.01) |
| G08B 23/00 | (2006.01) |
| H04L 29/06 | (2006.01) |
| H04L 12/24 | (2006.01) |
| G06F 21/55 | (2013.01) |

(52) U.S. Cl.
CPC ........ H04L 63/1433 (2013.01); G06F 21/552 (2013.01); H04L 41/0816 (2013.01); *G06F 2221/034* (2013.01)

(58) Field of Classification Search
CPC ............. H04L 63/1433; H04L 41/0816; G06F 21/552; G06F 2221/034
See application file for complete search history.

(56) References Cited

U.S. PATENT DOCUMENTS

| | | | | |
|---|---|---|---|---|
| 6,314,460 B1* | 11/2001 | Knight | .................. | G06F 3/0626 709/212 |
| 8,595,845 B2* | 11/2013 | Basavapatna | ......... | G06F 21/577 705/38 |
| 9,747,570 B1* | 8/2017 | Vescio | ............... | G06Q 10/0635 |
| 2011/0093309 A1* | 4/2011 | Dayasindhu | ........... | G06Q 10/06 705/7.28 |
| 2012/0053981 A1* | 3/2012 | Lipps | ................. | G06Q 10/0635 705/7.28 |
| 2013/0191919 A1* | 7/2013 | Basavapatna | ....... | H04L 63/1408 726/25 |

(Continued)

*Primary Examiner* — John B King
*Assistant Examiner* — Darshan I Dhruv
(74) *Attorney, Agent, or Firm* — Baker Botts L.L.P.

(57) ABSTRACT

A cyber security risk model mitigates cyber security risks for an asset environment (including a virtual asset) by utilizing a functions, connections and identities to determine a cyber security risk index (CSRI). An asset environment may comprise one or more functions where each function has one or more connections associated with any one or more of the functions and one or more identities associated with the virtual asset. A CSRI may be determined for each function based on the cyber security risk model that takes into account the cyber security risks or attributes associated with each function, connection and identity associated with the virtual environment or virtual asset. The asset environment may be adjusted, reconfigured, or otherwise altered based on the CSRI for any given function or for an overall CSRI. An alert may also be triggered based, at least in part, on a determined CSRI.

19 Claims, 11 Drawing Sheets

(56) References Cited

U.S. PATENT DOCUMENTS

| | | | |
|---|---|---|---|
| 2014/0137257 A1* | 5/2014 | Martinez | H04L 63/1433 |
| | | | 726/25 |
| 2016/0012236 A1* | 1/2016 | Giakouminakis | G06F 21/57 |
| | | | 726/25 |
| 2017/0244740 A1* | 8/2017 | Mahabir | H04L 63/0428 |
| 2017/0329966 A1* | 11/2017 | Koganti | H04L 63/1433 |
| 2018/0048668 A1* | 2/2018 | Gupta | H04L 63/1433 |
| 2018/0191765 A1* | 7/2018 | Cho | H04L 63/1425 |
| 2018/0316701 A1* | 11/2018 | Holzhauer | H04L 63/1425 |
| 2019/0303395 A1* | 10/2019 | Flood | G06F 16/355 |

\* cited by examiner

| Cybersecurity Risk Index Calculation | | |
|---|---|---|
| Risk = $F \times C \times I$ | | |
| 222 | $F = F_c \times F_i$ | $F_c$ is Cardinality of Each Communicating Function Set<br>$F_i$ is Function Set Connection Type: (1) Discrete, (2) Simple, (3) Complex, & (4) VLN |
| 224 | $C = C_i \times C_v$ | $C_i$ is Number of Invulnerable Connection Points<br>$C_v$ is Number of Vulnerable Connection Points |
| 226 | $I = [\frac{I_{th}}{I_{td}}] + [\frac{I_{uh}}{I_{ud}}]$ | $I_{th}$ is Number of Trusted Human Identities Who Can Access the Function<br>$I_{uh}$ is Number of Untrusted Human Identities Who Can Access the Function<br>$I_{td}$ is Number of Trusted Devices that Can Access the Function<br>$I_{ud}$ is Number of Untrusted Devices that Can Access the Function |

FIG. 3

| Set | Functions | | | Function Set Cardinality | Connection Category | Connections | | | | Identities | | | | | CSRI | |
|---|---|---|---|---|---|---|---|---|---|---|---|---|---|---|---|---|
| | Function Number $F_n$ | Member of Set? $F_t$ | | $F_c$ | $F_i$ | F | Total Connections $C_n$ | Invulnerable Connections $C_i$ | Vulnerable Connections $C_v$ | C | Trusted Humans $I_{th}$ | Untrusted Humans $I_{uh}$ | Trusted Devices $I_{td}$ | Untrusted Devices $I_{ud}$ | I | By Function | By Function Set |
| A | 1 | Yes | | 5 | VLN | 25 | 4 | 2 | 2 | 1.0 | 25 | 25 | 25 | 3 | 1.1 | 28 | 166 |
| | 2 | Yes | | 5 | VLN | 25 | 4 | 0 | 4 | 4.0 | 25 | 25 | 25 | 0 | 1.0 | 100 | |
| | 3 | Yes | | 5 | VLN | 25 | 3 | 2 | 1 | 0.5 | 25 | 25 | 25 | 0 | 1.0 | 13 | |
| | 4 | Yes | | 5 | VLN | 25 | 3 | 2 | 1 | 0.5 | 25 | 25 | 25 | 0 | 1.0 | 13 | |
| | 5 | Yes | | 5 | VLN | 25 | 3 | 2 | 1 | 0.5 | 25 | 25 | 25 | 0 | 1.0 | 13 | |
| B | 6 | Yes | | 4 | Complex | 12 | 2 | 2 | 0 | 0.0 | 13 | 3 | 13 | 3 | 0.5 | 0 | 6 |
| | 7 | Yes | | 4 | Complex | 12 | 2 | 2 | 0 | 0.0 | 13 | 3 | 13 | 3 | 0.5 | 0 | |
| | 8 | Yes | | 4 | Complex | 12 | 2 | 1 | 1 | 1.0 | 13 | 3 | 13 | 3 | 0.5 | 6 | |
| | 9 | Yes | | 4 | Complex | 12 | 2 | 2 | 0 | 0.0 | 13 | 3 | 13 | 3 | 0.5 | 0 | |
| C | 10 | No | | 1 | Discrete | 1 | 6 | 0 | 6 | 6.0 | 6 | 2 | 8 | 1 | 0.5 | 3 | 3 |
| D | 11 | No | | 1 | Discrete | 1 | 7 | 6 | 1 | 0.2 | 8 | 1 | 8 | 1 | 0.3 | 0.0 | 0.042 |
| E | 12 | No | | 1 | Discrete | 1 | 6 | 5 | 1 | 0.2 | 7 | 1 | 7 | 1 | 0.3 | 0.1 | 0.1 |
| F | 13 | No | | 1 | Discrete | 1 | 5 | 4 | 1 | 0.3 | 4 | 1 | 4 | 1 | 0.5 | 0.1 | 0.1 |
| | | | | Total | | 49 | 30 | 19 | | 202 | 142 | 204 | 19 | | 174 | |

FIG. 4B

| Set | Functions | | | | | Connections | | | | Function | | | | CSRI | |
|---|---|---|---|---|---|---|---|---|---|---|---|---|---|---|---|
| | Function $F_n$ | Member of Function Set $F_t$ | Function Set $F_c$ | Connection $F_i$ | F | Total $C_n$ | Invulnerable $C_i$ | Vulnerable $C_v$ | C | Trusted $I_{th}$ | Untrusted $I_{uh}$ | Trusted $I_{td}$ | Untrusted $I_{ud}$ | I | By Function | By Function Set |
| A | 1 | Yes | 5 | VLN | 25 | 4 | 2 | 2 | 1.0 | 25 | 25 | 25 | 3 | 1.1 | 28 | 166 |
| | 2 | Yes | 5 | VLN | 25 | 4 | 0 | 4 | 4.0 | 25 | 25 | 25 | 0 | 1.0 | 100 | |
| | 3 | Yes | 5 | VLN | 25 | 3 | 2 | 1 | 0.5 | 25 | 25 | 25 | 0 | 1.0 | 13 | |
| | 4 | Yes | 5 | VLN | 25 | 3 | 2 | 1 | 0.5 | 25 | 25 | 25 | 0 | 1.0 | 13 | |
| | 5 | Yes | 5 | VLN | 25 | 3 | 2 | 1 | 0.5 | 25 | 25 | 25 | 0 | 1.0 | 13 | |
| B | 6 | Yes | 4 | Complex | 12 | 2 | 2 | 0 | 0.0 | 13 | 3 | 13 | 3 | 0.5 | 0 | 6 |
| | 7 | Yes | 4 | Complex | 12 | 2 | 2 | 0 | 0.0 | 13 | 3 | 13 | 3 | 0.5 | 0 | |
| | 8 | Yes | 4 | Complex | 12 | 2 | 1 | 1 | 1.0 | 13 | 3 | 13 | 3 | 0.5 | 6 | |
| | 9 | Yes | 4 | Complex | 12 | 2 | 2 | 0 | 0.0 | 13 | 3 | 13 | 3 | 0.5 | 0 | |
| C | 10 | Yes | 4 | Simple | 8 | 6 | 0 | 6 | 6.0 | 6 | 2 | 8 | 1 | 0.5 | 22 | 23 |
| D | 11 | Yes | 4 | Simple | 8 | 7 | 6 | 1 | 0.2 | 8 | 1 | 8 | 0 | 0.3 | 0 | |
| | 12 | Yes | 4 | Simple | 8 | 6 | 5 | 1 | 0.2 | 7 | 1 | 7 | 0 | 0.3 | 0 | |
| E | 14 | Yes | 4 | Simple | 8 | 5 | 4 | 1 | 0.3 | 7 | 1 | 7 | 1 | 0.3 | 1 | |
| F | 13 | No | 1 | Discrete | 1 | 5 | 4 | 1 | 0.3 | 4 | 1 | 4 | 1 | 0.5 | 0 | 0.1 |
| | | | | | Total | 54 | 34 | 20 | | 209 | 143 | 211 | 20 | | | 195 |

FIG. 5B

| Set | Functions | | | | Connections | | | | Function | | | | CSRI | |
|---|---|---|---|---|---|---|---|---|---|---|---|---|---|---|
| | Function Number $F_n$ | Member of a Set? $F_1$ | Function Set Cardinality $F_c$ | Connection Category $F_i$ | F | Total Connections $C_n$ | Invulnerable Connections $C_i$ | Vulnerable Connections $C_v$ | C | Trusted Humans $I_{th}$ | Untrusted Humans $I_{uh}$ | Trusted Devices $I_{td}$ | Untrusted Devices $I_{ud}$ | I | By Function | By Function Set |
| A, C, D, E | 1 | Yes | 5 | VLN | 25 | 4 | 2 | 2 | 1.0 | 25 | 25 | 25 | 3 | 1.1 | 28 | 326 |
| | 2 | Yes | 5 | VLN | 25 | 4 | 0 | 4 | 4.0 | 25 | 25 | 25 | 0 | 1.0 | 100 | |
| | 3 | Yes | 5 | VLN | 25 | 3 | 2 | 1 | 0.5 | 25 | 25 | 25 | 0 | 1.0 | 13 | |
| | 4 | Yes | 5 | VLN | 25 | 3 | 2 | 1 | 0.5 | 25 | 25 | 25 | 0 | 1.0 | 13 | |
| | 5 | Yes | 5 | VLN | 25 | 3 | 2 | 1 | 0.5 | 25 | 25 | 25 | 0 | 1.0 | 13 | |
| | 10 | Yes | 5 | VLN | 25 | 6 | 0 | 6 | 6.0 | 6 | 2 | 8 | 1 | 0.5 | 69 | |
| | 11 | Yes | 5 | VLN | 25 | 7 | 0 | 1 | 0.2 | 8 | 1 | 8 | 1 | 0.3 | 1 | |
| | 12 | Yes | 5 | VLN | 25 | 6 | 5 | 1 | 0.2 | 7 | 1 | 7 | 1 | 0.3 | 1 | |
| | 14 | Yes | 5 | VLN | 25 | 5 | 4 | 1 | 0.3 | 7 | 1 | 7 | 1 | 0.3 | 2 | |
| | 15 | Yes | 5 | VLN | 25 | 3 | 0 | 3 | 3.0 | 25 | 26 | 25 | 3 | 1.2 | 87 | |
| B | 6 | Yes | 4 | Complex | 12 | 2 | 2 | 0 | 0.0 | 13 | 3 | 13 | 3 | 0.5 | 0 | 6 |
| | 7 | Yes | 4 | Complex | 12 | 2 | 2 | 0 | 0.0 | 13 | 3 | 13 | 3 | 0.5 | 0 | |
| | 8 | Yes | 4 | Complex | 12 | 2 | 1 | 1 | 1.0 | 13 | 3 | 13 | 3 | 0.5 | 6 | |
| | 9 | Yes | 4 | Complex | 12 | 2 | 2 | 0 | 0.0 | 13 | 3 | 13 | 3 | 0.5 | 0 | |
| F | 13 | No | 1 | Discrete | 1 | 5 | 4 | 1 | 0.3 | 4 | 1 | 4 | 1 | 0.5 | 0.1 | 0.1 |
| | | | | Total | | 57 | 34 | 23 | 0.3 | 234 | 169 | 236 | 23 | | | 331 |

FIG. 6B

CYBER SECURITY RISK MODEL AND INDEX

FIELD OF THE DISCLOSURE

The present disclosure generally relates to improving information handling system cyber security and more particularly to a cyber security risk model and index to mitigate cyber security risks of an information handling system.

BACKGROUND

Conventional analytical techniques for calculating a cyber security risk for an information handling system include set theory calculations for optimizing networked groups of critical functions, as well as simple analytical techniques for minimizing both unprotected digital connection nodes and untrusted identities that can access those nodes. These conventional analytical techniques are largely qualitative, characterizing cyber security risk based on threats, vulnerabilities and consequences. While such are useful in understanding cyber security risks, these analytical techniques are generally not quantifiable. Specifically, these conventional analytical techniques do not adequately address, for example, the cyber security risks at an asset environment, for example, a maritime environment, that typically includes various access points for or at various equipment, components and nodes.

BRIEF DESCRIPTION OF THE DRAWINGS

For a detailed description of the embodiments of the invention, reference will now be made to the accompanying drawings in which:

FIG. 3 depicts a cyber security risk model, according to one or more aspects of the present disclosure;

FIG. 4B illustrates a cyber security risk model for the virtual asset environment of FIG. 4A, according to one or more aspects of the present disclosure;

FIG. 5B illustrates a cyber security risk model for the virtual asset environment of FIG. 5A, according to one or more aspects of the present disclosure;

FIG. 6B illustrates a cyber security risk model for the virtual asset environment of FIG. 6A, according to one or more aspects of the present disclosure;

DETAILED DESCRIPTION

Figure 1:
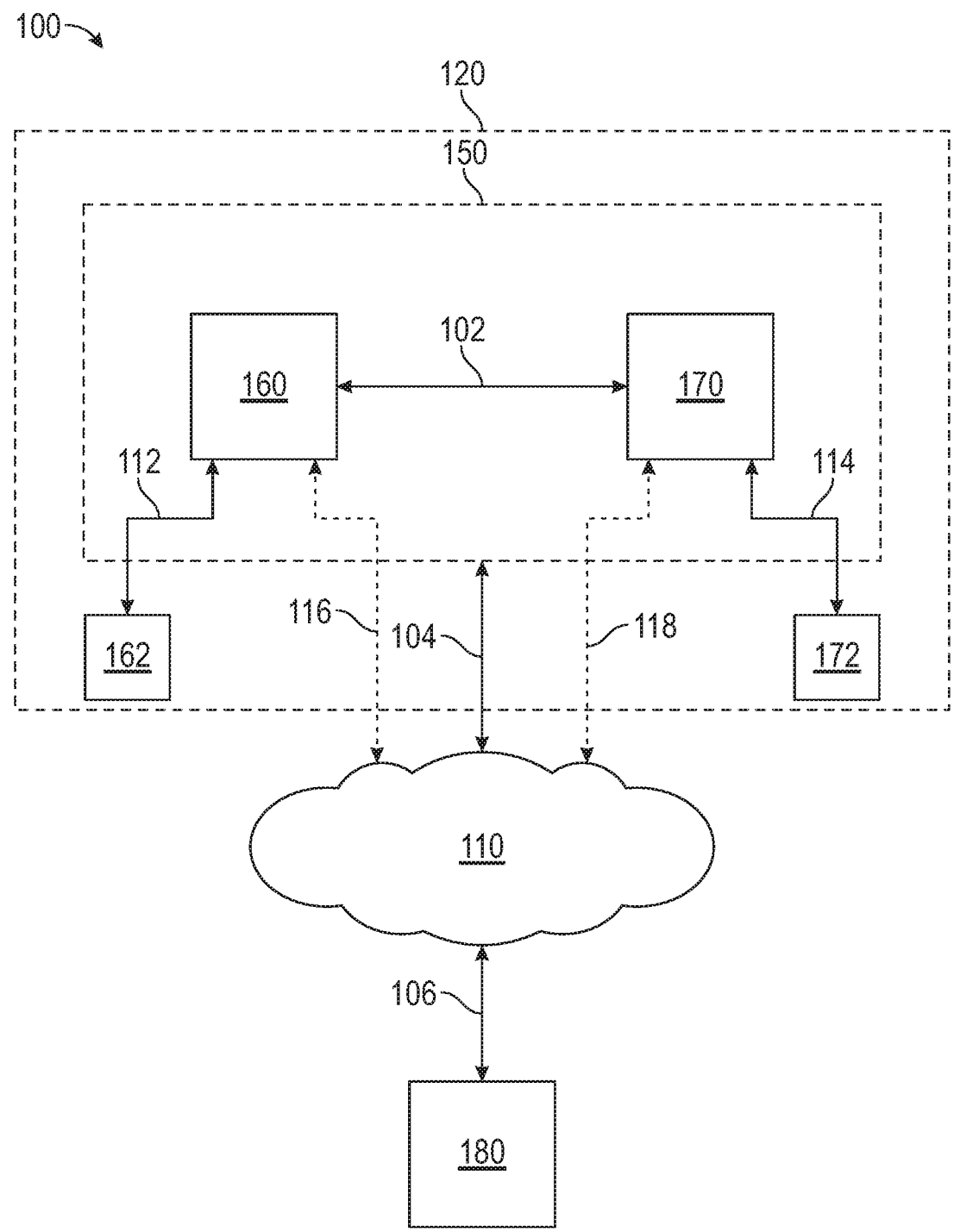
FIG. 1 depicts an example information handling system environment, according to one or more aspects of the present disclosure.

The present disclosure relates to a cyber security risk model and index for mitigating cyber risks for an information handling system, for example, a maritime information handling system. According to one or more embodiments, an information handling system may comprise, be associated with or otherwise correspond to a marine transportation system (MTS). An MTS is a sophisticated network of waterways, ports, and intermodal connections that facilitates the movement of people and goods on the water. The MTS is a highly complex system where many types of facilities, vessels, barges, and infrastructure components operate daily to ensure safe and efficient maritime commerce. The MTS has a network of maritime operations that interface with shore side operations at intermodal connections as port of global supply chain and domestic commercial operations. The MTS includes thousands of waterfront facilities, attractions and buildings that may not be explicitly part of the MTS but which can impact MTS operations. Thus, the MTS may have many access points that pose a cyber security risk.

Assessing cyber security risks for an information handling system, such as a maritime information handling system, is inherently difficult as the industries and assets operating within the information handling system are broad and diverse and the array of cyber threats are innumerable and evolving. An information handling system may comprise one or more of an information technology (IT) system and an operational technology (OT) system. An IT system may comprise technologies for information handling and processing, for example, software, hardware, communications technologies and protocols and related services. An OT system may comprise hardware and software for detecting or causing a change by the monitoring, control or both of physical devices, one or more process and one or more events in a network or information handling system configuration. An OT system may include industrial controls systems (ICS) and systems specified in section 2 of the National Institute of Standards and Technology (NIST) Special Publication (SP) 800-82.

IT systems and OT system are generally considered to be different systems as each exists for different purposes, use different technologies and protocol, have different failure consequences. Cyber security risks for IT systems include, but are not limited to, email hacks, data breaches, ransomware attacks and denial of service attacks. Cyber security risks for OT systems include, but are not limited to, equipment damage, safety issues, operation downtime and property damage. Due to the difference between IT systems and OT systems, each may assess priorities differently. For example, OT system may emphasize availability, integrity and confidentiality while IT systems may prioritize confidentiality over integrity and integrity over availability. Even with these differences, OT systems and IT systems are increasingly being integrated increasing the need for efficient and accurate cyber risk assessment and analysis. The present disclosure provides systems and methods for mitigating cyber security risks for maritime operations including, but not limited to, cargo and passenger vessels and associated services and operations. The imperative to identify, analyze and mitigate risk requires that risk be countable and calculable. In one or more embodiments, cyber security risks are mitigated by utilizing a cyber security risk model to obtain an index to, for example, provide modifications to or adjustments of a configuration of an information handling.

In one or more embodiments of the present disclosure, an environment may utilize an information handling system to control, manage or otherwise operate one or more operations, devices, components, networks, any other type of system or any combination thereof. For purposes of this disclosure, an information handling system may include any instrumentality or aggregate of instrumentalities that are configured to or are operable to compute, classify, process, transmit, receive, retrieve, originate, switch, store, display, manifest, detect, record, reproduce, handle, or utilize any form of information, intelligence, or data for any purpose, for example, for a maritime vessel or operation. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. The information handling system may also include one or more interface units capable of transmitting one or more signals to a controller, actuator, or like device.

For the purposes of this disclosure, computer-readable media may include any instrumentality or aggregation of instrumentalities that may retain data, instructions or both for a period of time. Computer-readable media may include, for example, without limitation, storage media such as a sequential access storage device (for example, a tape drive), direct access storage device (for example, a hard disk drive or floppy disk drive), compact disk (CD), CD read-only memory (ROM) or CD-ROM, DVD, RAM, ROM, electrically erasable programmable read-only memory (EEPROM), and/or flash memory, biological memory, molecular or deoxyribonucleic acid (DNA) memory as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

Throughout this disclosure, a reference numeral followed by an alphabetical character refers to a specific instance of an element and the reference numeral alone refers to the element generically or collectively. Thus, as an example (not shown in the drawings), widget "1A" refers to an instance of a widget class, which may be referred to collectively as widgets "1" and any one of which may be referred to generically as a widget "1". In the figures and the description, like numerals are intended to represent like elements.

Various aspects of the present disclosure may be implemented in various environments. For example, FIG. 1 depicts an asset environment 100 according to one or more aspects of the present disclosure. Asset environment 100 may comprise any one or more information handling systems 150. Information handling system may comprise one or more information handling systems 700 of FIG. 7. In one or more embodiments, an information handling system 150 is associated with a maritime environment, for example, as discussed with respect to FIGS. 4A-6B. The information handling system 150 may comprise one or more IT systems 160, one or more OT systems 170 or both. In one or more embodiments, IT system 160 may be communicatively coupled to OT system 170 via connection 102. Any one or more components of information handling system 150 may communicate with network 110 via connection 104. In one or more embodiments, IT system 160 and OT system 170 may be communicatively coupled to network 110 via connections 116 and 118, respectively, via connection 104 and any combination thereof. In one or more embodiments, the IT system 160 and the OT system 170 may be integrated.

In one or more embodiments, IT system 160 may be communicatively coupled to one or more devices 162 via a connection 112. The one or more devices 162 may comprise any one or more of a router, a firewall, an information handling system, for example, information handling system 700 of FIG. 7, a security system, a server (such as an email server), any one or more mobile devices, including but not limited to, an interface, for example, a human machine interface (HMI), a cellular device, a laptop and a notebook, a database repository, a bridge navigation and communication system, a data center, a storage medium, or any other device utilized in an IT system 160.

In one or more embodiments, OT system 170 may be communicatively coupled to one or more devices 172 via a connection 114. The one or more devices 172 may comprise any one or more of an information handling system 700 of FIG. 7, a server, a cargo management system, a firewall, a materials storage container, a pipeline, a control system, a program logic controller, an interface, for example, an HMI, or any other device utilized in an OT system 170.

In one or more embodiments, network 110 may be communicatively coupled to cyber security risk assessment module 180 via a connection 106. In one or more embodiments, network 110 may communicatively couple IT system 160 and OT system 170 using connections 116 and 118. In one or more embodiments, network 110 may be communicatively coupled to a cyber security risk assessment module 180 so that the cyber security risks of the asset environment 100 may be monitored, maintained, adjusted or otherwise configured. One or more cyber security risks may include, but not are not to, disruption, exploitation, corruption or misuse of a network, environment or control system.

In one or more embodiments, connections 102, 104, 106, 112, 114, 116 and 118 may be a direct connection, indirect connection, wireless connection, physical connection, any other communicative connection, or any combination thereof. In addition to or including the devices 162 and 172 discussed above, an IT system 160, an OT system 170 or both (for example, when part of a maritime environment) may comprise or be communicatively coupled to any one or more of a storage medium (including, but not limited to, a hard drive, an optical drive, a universal serial bus (USB) drive, a compact disc (CD) and a digital video disc (DVD)) a communication system (including, but not limited to, a satellite communication equipment, a voice over Internet protocol (VOIP) equipment, wireless local area network (WLAN) and a public address and general alarm system), a bridge system (including but not limited to, a positioning system, an electronic chart display information system, an automatic identification system (AIS), a global maritime distress and safety system (AIS), radar equipment and a voyage data recorder (VDRs)), a cargo manage systems, a propulsion, machinery and power control system (including, but not limited to, an alarm system and an emergency response system), an access control system (including but not limited to, a surveillance system, a bridge navigational watch alarm system, shipboard security alarm system and an electronic personnel-on-board system), a passenger servicing and management system (including, but not limited to, property management system (PMS), a medical record and a ship passenger or seafarer boarding access system), a passenger facing network (including, but not limited to, a passenger wireless fidelity (WI-FI) or local area network (LAN) Internet access, a guest entertainment system, a communication), a core infrastructure system, an administrative and crew welfare system (including, but not limited to, an administrative system, a crew WI-FI and a crew LAN), an operational control system (including, but not limited to, a distributed control system, a ramp control system, a terminal operating system, an independent safety system, an alarm system, a fire protection system, an environmental protection system and an emergency shut-down system), a building management control system (including, but not limited to, a building automation system, a vertical transport system (such as an escalator or elevator), a lighting control system, a digital video management system, an energy management system and a heating/ventilation/air conditioning (HVAC) system), a building safety system (including but not limited to, a fire alarm system, a fire sprinkler system, a gas detector, a radio, smoke and purge system and an emergency management system), a security system (including, but not limited to, a physical access control system, an intrusion detection system, a surveillance system, a screening system, a police dispatch system), a business system (including but not limited to, a passenger check-in system, a telecommunication system, an email server, an e-commerce server, an enterprise resource planning system, an inventory system, a procurement system, a point-of-sale system, an production system, a distribution system, an accounting system and a sales system) and any other type of system utilized in an IT system 160 or an OT system 170 (including, but not limited to, a digital signage system, a laboratory instrument control system, a renewable energy geothermal system, a renewable energy photo voltaic system, a shade control system and an advanced metering infrastructure).

As the information handling system 150, the device 162, the device 172 and any combination thereof may be physical devices but generally unseen, such devices and systems may be referred to as a virtual asset 120. A virtual asset 120 represents the structure and behavior of the collections of systems on an asset, for example, a vessel, a cargo area, a port, a shipyard, any other asset or any combination thereof. A virtual asset 120 may comprise the aggregation of any one or more software applications and computerized technologies control mechanical systems that provide any one or more operations for the asset environment 100, for example, any one or more IT systems 160 and OT systems 170.

Figure 2:
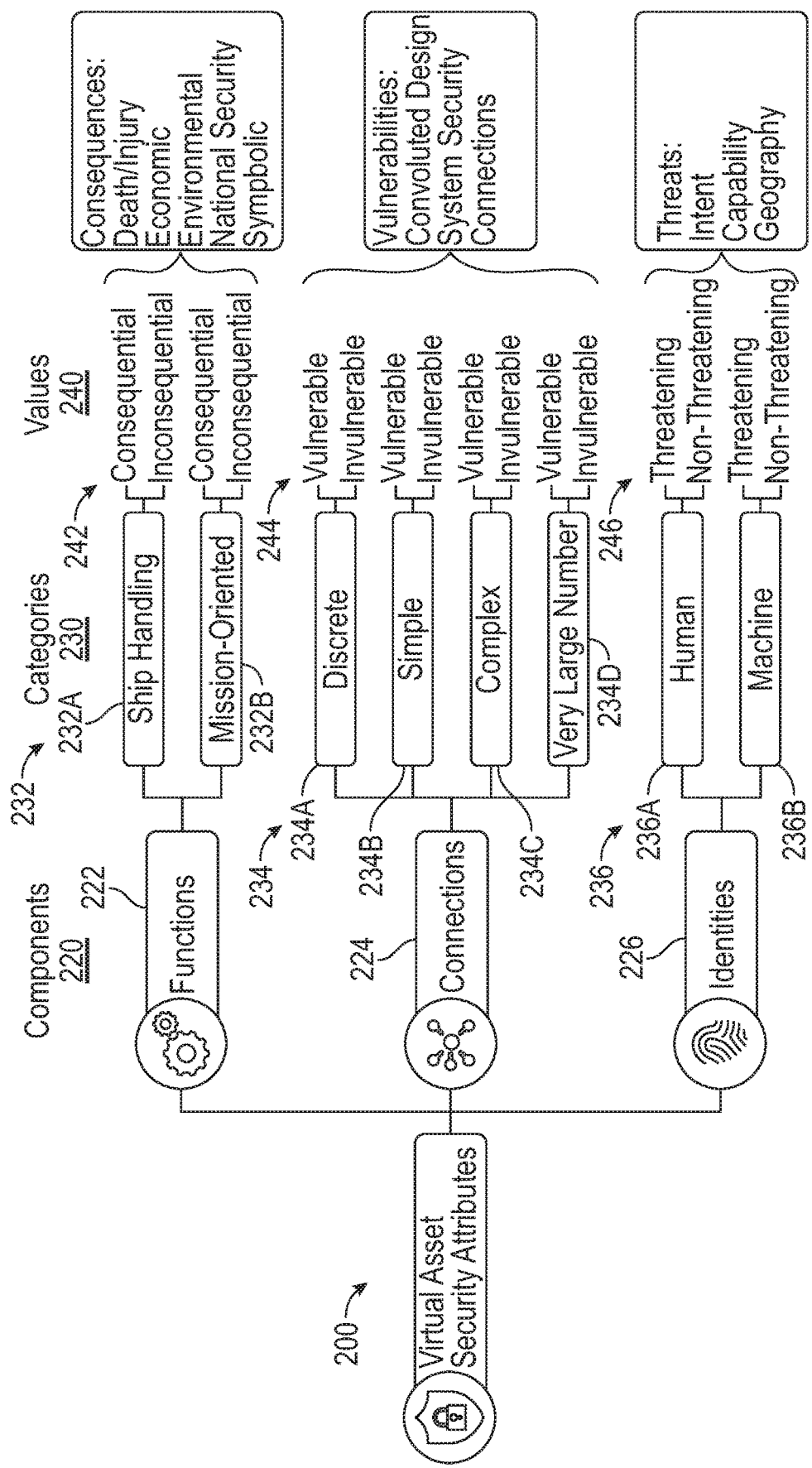
FIG. 2 depicts virtual asset security attributes for a virtual asset, according to one or more aspects of the present disclosure.

As illustrated in FIG. 2, a virtual asset 120 may comprise one or more virtual asset security attributes 200, according to one or more aspects of the present disclosure. The one or more virtual asset security attributes 200 are parameters of a cyber security risk model used by the cyber security risk assessment module 180 to determine a cyber security risk index. Virtual asset security attributes 200 comprise one or more components 220 where the one or more components 220 comprise one or more categories 230 and where the one or more categories 230 comprise one or more values 240. In one or more embodiments, any one or more of a component 220, a category 230 and a value 240 may be represented using a numerical value. For example, a value 240 may be represented as a binary numeral, a "1" or a "0". The one or more components 220 comprise one or more functions 222, one or more connections 224 and one or more identities 226.

A function 222 may comprise one or more software applications that control, manage, or otherwise operate a device of the asset environment 100, for example, a maritime environment, through a communications link. Each function 222 may be associated with a category 232 where each category 232 is assigned a value 242 that identifies the function 222 as consequential or inconsequential. The threshold for consequential or inconsequential may be determined by each organization or entity associated with the virtual asset 120.

A connection 224 may comprise one or more access points and nodes 234 associated with any one or more functions 222 that have a measurable cyber security risk characteristic, may be accessible digitally or through a human machine interface (HMI) or both. The measurable cyber security risk characteristic may be indicative of a complexity of cyber security for an associated component or device of asset environment 100. Each connection 224 associated with a consequential function 222 is assigned a category 230, for example, a connection type of discrete 234A, simple 234B, complex 234C and VLN 234D as discussed below with respect to TABLE 1. Each connection 224 within each category 230 is assessed a value of vulnerable or invulnerable or protected. A protected connection, for example, an invulnerable connection, may comprise, for example, a physical blocking device, a compensating protection (for example, a locked room) and a software security application that monitors digital activity, recognizes an unauthorized activity as anomalous and potentially threatening, and blocks the activity, generates an alert or both so that a response may be dispatched to protect any connected elements from intrusion. An anomalous activity may comprise an out-of-pattern repeated logons, out-of-pattern logged on durations and out-of-pattern messaging activity.

An identity 226 may comprise one or more interfaces 236 (for example, a human 236A or machine interface 236B) that sends or receives data or information via one or more interfaces. Each identity 226 associated with each one or more interfaces 236 is assessed a value 246 of threatening or non-threatening. A threatening value 246 may also be associated with untrusted and non-threatening may be associated with trusted. In one or more embodiments, an identity 226 may be considered non-threatening or trusted if the identity is recognized in formal access documentation as an identity authorized to access the defined or named access points of the virtual asset 120, is provisioned with appropriate access credentials, any other authorization verification and any combination thereof. In one or more embodiments, access credentials may comprise managed and protected passwords, identification credentials, including, but not limited to, a badge, an inventory identification, a digital identification and any other identification, multifactor access credentials or tokens, trained cybersecurity policies and procedures, temporary access authorization credentials (for example, supplier permissions), any other cyber security credential and any combination thereof. In one or more embodiments, any identity 226 not assessed as trusted is assessed as threatening or untrusted. In one or more embodiments, an identity 226 may be assessed a value of untrusted even though one or more credentials are associated with the identity 226. For example, an identity 226 be associated with or identified in an authorized list of identities but may be assessed as having a value of threatening or untrusted if the identity 226 is not on a list of identities trained in one or more security procedures.

The behavior associated with any one or more of the functions 222, connections 224 and identities 226 may be parameters or inputs for a cyber security risk model to determine if the asset environment 100 is secure or to mitigate any one or more cyber security risks.

One issue with respect to determining or analyzing cyber security risks for a virtual asset 120 or asset environment 100 includes determining which elements, aspects or devices to measure or monitor. Using the components 220 of one or more functions 222, one or more connections 224 and one or more identities 226, a model may be developed that measures or determines cyber security risks so as to identify or predict a potential point of failure. A set of virtual asset security attributes 200 that are essential to understanding potential points of failure maybe determined which requires an understanding of virtual asset breadth and virtual asset depth associated with the virtual asset 120 or asset environment 100.

Virtual asset breadth is defined by the number of critical cyber-related functions on an asset. The one or more critical cyber related functions may comprise any function that is critical for safety of persons on or about an asset environment 100. The one or more critical cyber related functions 222 may be categorized into one or more categories 230, for example, as ship handling category 232A and a mission-oriented category 232B. While the present disclosure discusses functions associated with a maritime environment or asset, the present disclosure contemplates any type of environment or asset that may be susceptible to one or more cyber security risks. The one or more functions in the ship handling category 232A may comprise one or more functions required to ensure safety (for example, safe movement of a vessel and prevention of vessel collision, allisions, and grounding) of the virtual asset 120 or asset environment 100, for example, navigation, propulsion, ballast, power and communication. The one or more functions in the mission-oriented category 232B may comprise one or more functions associated with the purpose or mission of the virtual asset 120 or asset environment 100, for example, cargo management, vapor control, drilling control and well control.

Virtual asset depth is defined by complexity of any one or more of one or more functions, one or more business attributes and system documentation associated with a virtual asset 120 or asset environment 100. Virtual asset depth may be assessed by inventorying one or more cyber complexity of the safety-critical functions (for example, Functions 222: criticality of functions to safe operation, Connections 224: complexity of one or more connections and Identities 226: accessing one or more identities), one or more business attributes or constraints and capabilities of an environment or enterprise (for example, one or more regulatory imperatives, OT deployment strategy and cyber security governance) and availability of one or more cyber security documents associated with the engineering rigor and execution of one or more devices, systems or networks within an environment or enterprise (for example, security responsibility evidence, design knowledge evidence and security control process evidence).

With respect to cyber security complexity, each function 222, connection 224 and identity 226 may comprise one or more characteristics or attributes according to a specific environment or asset that are used to develop a cyber security risk model. For example, the one or more virtual asset security attributes 200 may comprise any one or more of the one or more characteristics or attributes of Table 1.

TABLE 1

| Characteristic or Attribute | Description |
| --- | --- |
| Function: Number of instances of deployment of a function | Multiple instances of a function may be installed or deployed at multiple assets or locations. This information may be used to determine whether any function is copied exactly form one location to another location when designing cyber security protection systems which present opportunities for economy-of-scale protection or assessment considerations. |
| Function: Criticality of function to safe operation | Degradation of performance or failure of the function may result in injury, loss of life to personnel, damage to or loss of an asset, device, element, systems, structure or any other objects (generally, referred to herein as "elements") at an environment or asset, damage to surrounding environment, for example, a marine. |
| Connection: Connection type or control connection type | Connection types may comprise one or more of discrete, simple, complex and very large number (VLN).<br>Discrete: Characterized as a 1:1 connection in which an element is linked only to a corresponding control connection. Communications only occur between the element and the corresponding control connection such that other elements are not connected to the element.<br>Simple: Characterized as a 1:Few connection in which the element is linked to a plurality of corresponding control connections directly (for example, without a network between them).<br>Complex: Characterized as a 1:Many connection in which the element is linked to a plurality of corresponding control connections through, for example, a network.<br>VLN: Characterized as a 1:VLN in which the element is linked to the Internet, for example, via a network, and may be connected to a VLN associated with one or more nodes or elements of another asset or environment.<br>* In one or more embodiments, VLN may also be represented |

TABLE 1-continued

| Characteristic or Attribute | Description |
| --- | --- |
| | as an identity 222 as the threat posed by the potential for a very large number of unauthorized or untrusted identities accessing any element of the virtual asset 120 or any other system via, for example, a website or any other Internet access point. |
| Function: Management provider | A function may be managed, for example, by a provider of the element, a control system provider, any other provider and any combination thereof. An element may be managed by a provider as a service where the service may include cyber security monitoring, protection or both. |
| Function: Documentation | One or more functional description documents (FDD) may be associated with a given function. The one or more documents may explain or detail the functionality of the element, include one or more diagrams of a control system associated with the element, describe one or more interfaces associated with the element, define one or more failure states of the element, any other descriptive details, and any combination thereof. |
| Function/Identity: Type of cyber security system | A control system associated with a function may be provided by the supplier of the control system, for example, a proprietary cyber security control system. |
| Function: Regulated using industry standards | Functions that are performed according to applicable industry standards or are associated with a classification society may be assessed as having less cyber security risk than those that are not. |
| Identity: Type and location of identity with access | Cyber security risk may be assessed based, at least in part, on an identity's, such as an internal party or a third-party, location, for example, land-based, air-based, satellite-based, sea-based, subterranean-based. |

The one or more functions 222, the one or more connections 224 and the one or more identities 226 form a cyber security risk triangle or model. For example, any one or more functions 222, if compromised, may result in negative consequences including safety, economic and environmental impacts, connections 224, if not properly controlled, create an environment that enables or foments malicious or careless activity and identities, if untrusted, may intentionally or accidentally introduce threats into the virtual asset 120. A cyber security risk model identifies, counts and assesses these functions 222, connections 224 and identities 226.

Each virtual asset 120 may be unique or have varying attributes, for example, any one or more of the IT systems 160 and the OT systems 170 may be distinct or only share some commonalities. The cyber security risk model accounts for these unique or distinct attributes by focusing on the fundamental building blocks of every virtual asset 120—the one or more functions 222, the one or more connections 224 and the one or more identities 226 associated with the virtual asset 120. Using these building blocks, the cyber security risk model may be configured to represent any virtual asset 120 and may be assessed to generate relative cyber security risk indices that enable consistent cyber security risk comparison of disparate virtual assets 120 using a consistent measurement model.

FIG. 3 depicts a cyber security risk model, according to one or more aspects of the present disclosure. A cyber security risk index (CSRI) for a virtual asset 120 may be determined based, at least in part, on the cyber security risk model. The cyber security risk model comprises any one or more functions 222, any one or more connections 224 and any one or more identities 226. For example, Equation 1 may represent a cyber security risk model for determining a CSRI for a given virtual asset 120 or asset environment 100. Each parameter in Equation 1 may be expressed numerically, for example, by counting the number of instances of each within a virtual asset 120. The CSRI may be used to generate a relative risk score for each function 222 and an overall score for the virtual asset 120.

$$CSRI = F \times C \times I \quad \text{(Equation 1)},$$

where F corresponds to one or more functions 222, C corresponds to one or more connections 224 and I corresponds to one or more identities 226. The CSRI may also be expressed as CSRI=F+C+I where the representation of the CSRI may be a smaller value.

$$F = F_c \times F_t \quad \text{(Equation 2)},$$

where $F_c$ is cardinality of each communicating function set and $F_t$ is a function connection type, for example, discrete, simple, complex, VLN and any combination thereof.

$$C = C_i \times C_v \quad \text{(Equation 3)},$$

where $C_i$ is the number of invulnerable or protected connection points and $C_v$ is the number of vulnerable connection points.

$$I = \left[\frac{I_{uh}}{I_{td}}\right] + \left[\frac{I_{ud}}{I_{td}}\right], \quad \text{(Equation 4)}$$

where $I_{th}$ is the number of trusted human identities (th) who can access the function F, $I_{uh}$ is the number of untrusted human identities (uh) who can access the function F, $I_{td}$ is the number of trusted devices that can access the function F and $I_{ud}$ is the number of untrusted devices that can access the function F.

Figure 4A:
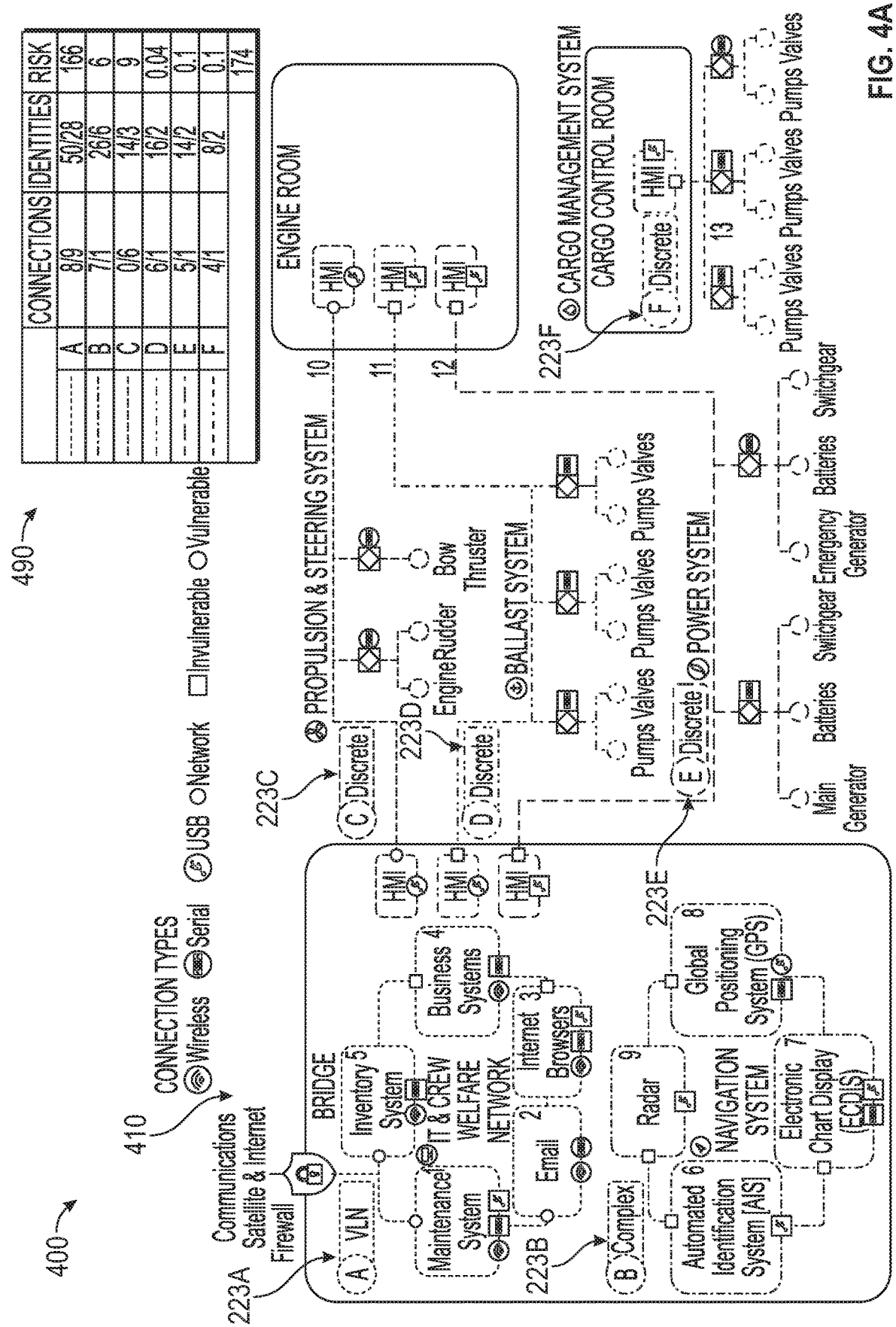
FIG. 4A depicts a virtual asset environment with a cyber security risk index for a plurality of functions, according to one or more aspects of the present disclosure.
Figure 5A:
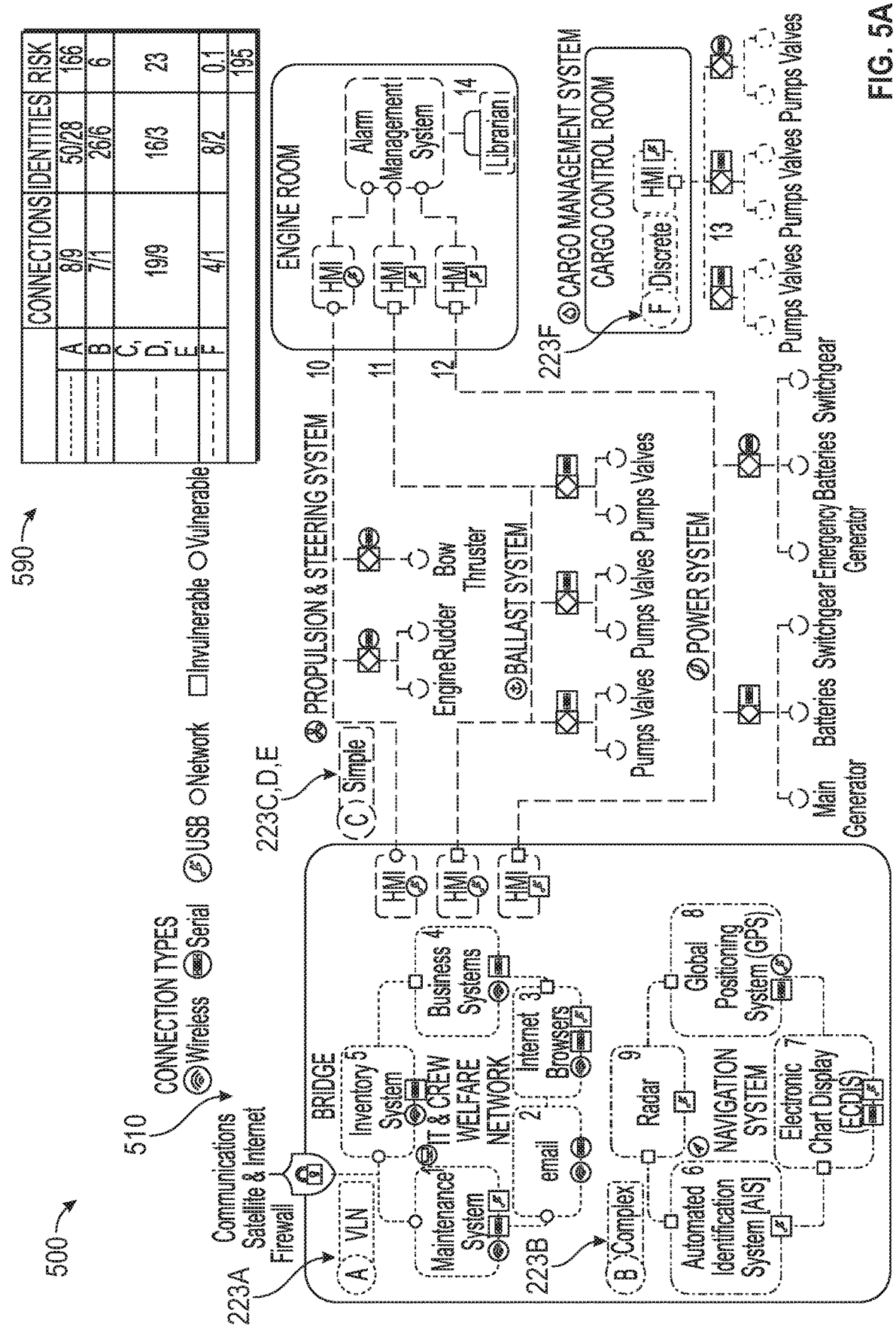
FIG. 5A depicts a virtual asset environment with cyber security risk index for a plurality of functions, according to one or more aspects of the present disclosure.
Figure 6A:
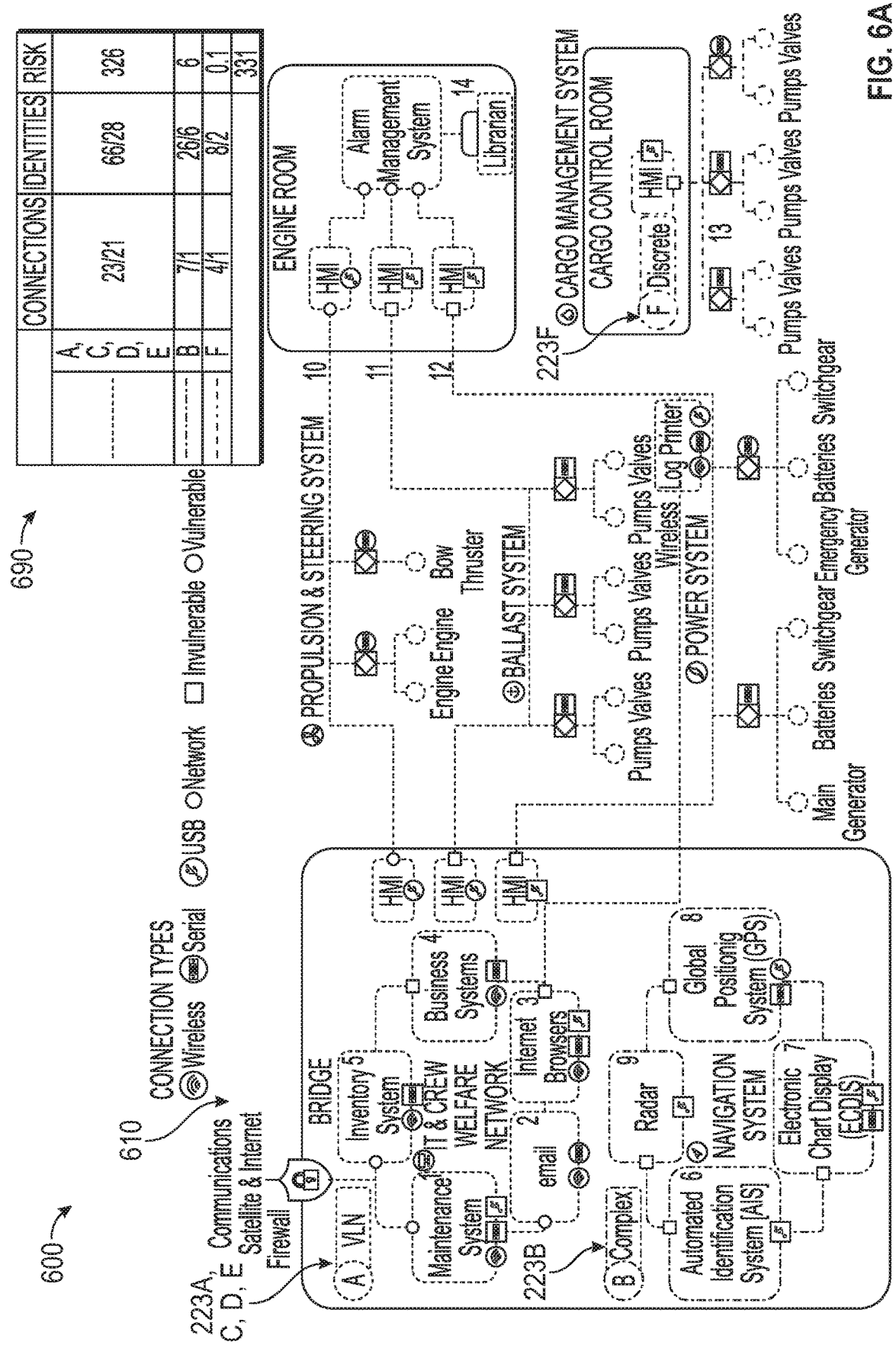
FIG. 6A depicts a virtual asset environment with cyber security risk index for a plurality of functions, according to one or more aspects of the present disclosure.

FIGS. 4A, 5A and 6A illustrate different architectures or configurations for a virtual asset 120 where the CSRI is determined based on a cyber security risk model, for example, for a maritime environment such as a vessel.

FIG. 4A depicts a virtual asset environment 400 with cyber security risk index for a plurality of function sets 223, according to one or more aspects of the present disclosure.

Virtual asset environment 400 may be a maritime environment, for example, a vessel. Virtual asset environment 400 may comprise a virtual asset 410 that comprises one or more function sets 223, for example, welfare network function set 223A, navigation system function set 223B, propulsion and steering system function set 223C, ballast system function set 223D, power system function set 223E and cargo management system function set 223F. Each of the function sets 223 comprise one or more functions 222, for example, function set 223A comprises a plurality of functions 222 labeled 1, 2, 3, 4 and 5, function set 223B comprises a plurality of functions 222 labeled 6, 7, 8 and 9, function set 223C comprises a function 222 labeled 10, function set 223D comprises a function 222 labeled 11, function set 223E comprises a function 222 labeled 12 and function set 223F comprise a function 222 labeled 13. Each of the functions 222 is associated with one or more devices, for example, any one or more of one or more devices 162, one or more 172, an IT system 160, and OT system 170, an information handling system 700 and any other equipment, machinery or system. Each function 222 of the plurality of function sets 223 comprise one or more connections 224 with each connection 224 comprising a connection type, for example, wireless, serial, USB, network and any combination thereof.

Table 490 comprises data or information for one or more cyber security risk parameters, for example, the parameters of Equations 1, 2, 3 and 4, and the CSRI for each function set 223 along with the overall CSRI for the virtual asset 410. For example, function set 223A comprises seventeen total connections with eight connections designated as invulnerable or protected and nine connections designated as vulnerable, function set 223B comprises eight total connections with seven connections designated as invulnerable or protected and one connection designated as vulnerable, function set 223C comprises six total connections with all six connections designated as vulnerable, function set 223D comprises seven total connections with six connections designated as invulnerable or protected and one connection designated as vulnerable, functions et 223E comprises six total connections with five connections designated as invulnerable or protected and one connection designated as vulnerable and function set 223F comprises five total connections with four connections designated as invulnerable or protected and one connections designated as invulnerable or protected. In the example embodiment of FIG. 4A, each function set 223 has an associated number of identities that have access to one or more connections or functions within the function set. Each identity in Table 490 is designated as non-threatening (first number) and threatening (second number). For example, function set 223A has 78 total identities associated with one or more functions or connections with fifty identities designated as non-threatening and twenty-eight identities designated as threatening. A CSRI for each function set 223 and for the virtual asset 410 is then determined based on the cyber security risk model. The CSRI in FIG. 4A is explained in more detail with respect to FIG. 4B.

The virtual asset 410 in FIG. 4A illustrates a segmented architecture where, for example, most or all of the safety-critical functions are on discrete networks isolated from the Information Technology (IT) and Crew Welfare Network of the bridge function 223A and the Internet. Access to the one or more functions 222 of FIG. 4A is limited to or requires a physical connection through one or more physical ports, for example, USB and serial ports. The virtual asset 410 generally has a lower cyber security risk exposure than virtual assets that are more integrated.

FIG. 4B illustrates a cyber security risk model for the virtual asset environment 400 of FIG. 4A, according to one or more aspects of the present disclosure. A CSRI based is calculated for each function set 223. In one or more embodiments, each function set is given a weight (F) based, at least in part, on any one or more of $F_n$ (function number), $F_s$ (member of a set), $F_c$ (function set cardinality) and $F_t$ (connection category). In one or more embodiments, each connection is given a weight (C) based, at least in part, on any one or more of $C_n$ (total connections), $C_i$ (invulnerable or protected connections) and $C_v$ (vulnerable connections). In one or more embodiments, each identity is given a weight (I) based, at least in part, on any one or more of $I_{th}$ (trusted humans), $I_{uh}$ (untrusted humans), $I_{td}$ (trusted devices) and $I_{ud}$ (untrusted devices). The CSRI for each function is tallied using the cyber security risk model of Equation 1. Any one or more parameters of Equation 1 may be weighted as indicated in FIG. 4B. The CSRI is presented in FIG. 4B for each function, for each function set and total for the virtual asset 410.

FIG. 5A depicts a virtual asset environment 500 with cyber security risk index for a plurality of functions 222, according to one or more aspects of the present disclosure. Virtual asset environment 500 may be a maritime environment, for example, a vessel. Virtual asset environment 500 may comprise a virtual asset 510 that comprises one or more function sets 223, for example, welfare network function set 223A, navigation system function set 223B, an integrated propulsion and steering system, ballast system, power system function set 223C,D,E and cargo management system function set 223F. Each of the function sets 223 comprise one or more functions 222, for example, function set 223A comprises a plurality of functions 222 labeled 1, 2, 3, 4 and 5, function set 223B comprises a plurality of functions 222 labeled 6, 7, 8 and 9, function set 223C,D,E comprises a plurality of functions 222 labeled 10, 11, 12 and 14 and function set 223F comprises a function 222 labeled 13. Each of the functions 222 is associated with one or more devices, for example, any one or more of one or more devices 162, one or more 172, an IT system 160, and OT system 170, an information handling system 700 and any other equipment, machinery or system. Each function 222 of the plurality of function sets 223 comprise one or more connections 224 with each connection 224 comprising a connection type, for example, wireless, serial, USB, network and any combination thereof.

Table 590 comprises data or information for one or more cyber security risk parameters, for example, for Equations 1, 2, 3 and 4 and the CSRI for each function set 223 along with the overall CSRI for the virtual asset 510. Table 590 is similar to Table 490 of FIG. 4 except that function sets 223 C, D and E have been integrated as function set 223C,D,E. Function set 223C,D,E comprises twenty-eight connections with nineteen connections designated as invulnerable or protected and nine connections designated as vulnerable. A CSRI for each function set 223 and for the virtual asset 510 is then determined based on the cyber security risk model. The CSRI in FIG. 5A is explained in more detail with respect to FIG. 5B The virtual asset 510 in FIG. 5A illustrates integration of discrete to simple system where at least three functions are integrated into a simple network, for example, through an alarm management system, that is still isolated from the Information Technology (IT) and Crew Welfare Network of the bridge function 222A and the Internet. While more integrated than virtual asset 410 of FIG. 4A, the virtual asset 510 only a slightly higher cyber security risk exposure as exploitation still requires access through one or more physical ports.

FIG. 5B illustrates a cyber security risk model for the virtual asset environment 500 of FIG. 5A, according to one or more aspects of the present disclosure. A CSRI is determined for each function 223 similar to the determination discussed with respect to FIG. 4B.

FIG. 6A depicts a virtual asset environment 600 with cyber security risk index for a plurality of function sets 223, according to one or more aspects of the present disclosure. Virtual asset environment 600 may be a maritime environment, for example, a vessel. Virtual asset environment 600 may comprise a virtual asset 610 that comprises one or more function sets 223, for example, welfare network, an integrated propulsion and steering system, ballast system, power system function set 223A,C,D,E, navigation system function set 223B, and cargo management system function set 223F. Each of the function sets 223 comprise one or more functions 222, for example, function set 223A,C,D,E comprises a plurality of functions 222 labeled 1, 2, 3, 4, 5, 11, 12, 14 and 15, function set 223B comprises a plurality of functions 222 labeled 6, 7, 8 and 9 and function set 223F comprises a function 222 labeled 13. Each of the functions 222 is associated with one or more devices, for example, any one or more of one or more devices 162, one or more 172, an IT system 160, and OT system 170, an information handling system 700 and any other equipment, machinery or system. Each function 333 of the plurality of function sets 223 comprise one or more connections 224 with each connection 224 comprising a connection type, for example, wireless, serial, USB, network and any combination thereof.

Table 690 identifies comprises data or information for one or more cyber security risk parameters, for example, for Equations 1, 2, 3 and 4 and the CSRI for each function along with the overall CSRI for the virtual asset 410. Table 690 is similar to Table 490 of FIG. 4 except that function sets 223 A, C, D and E have been integrated as function set 223A, C,D,E. Function set 223A,C,D,E comprises forty-four connections with twenty-three connections designated as invulnerable or protected and twenty-one connections designated as vulnerable.

The virtual asset 610 in FIG. 6A illustrates an inadvertent introduction of cyber security risk where at least four functions are integrated into a network that includes a printer introduced to the power system function. For example, the printer may be a wireless printer that periodically generates one or more logs of system performance. As illustrated, the printer creates an inadvertent wireless connection to the Information Technology (IT) and Crew Welfare Network of the bridge function and potentially the Internet. This has the effect of integrating several safety-critical functions and exposing them to potential exploitation from the Internet and is categorized as VLN. The cyber security risk of virtual asset 610 is significantly higher than the virtual asset 510 of FIG. 5A and the virtual asset 410 of FIG. 4A.

FIG. 6B illustrates a cyber security risk model for the virtual asset environment 600 of FIG. 6A, according to one or more aspects of the present disclosure. A CSRI is calculated for each function 223 similar to the determination discusses with respect to FIG. 4B.

Figure 7:
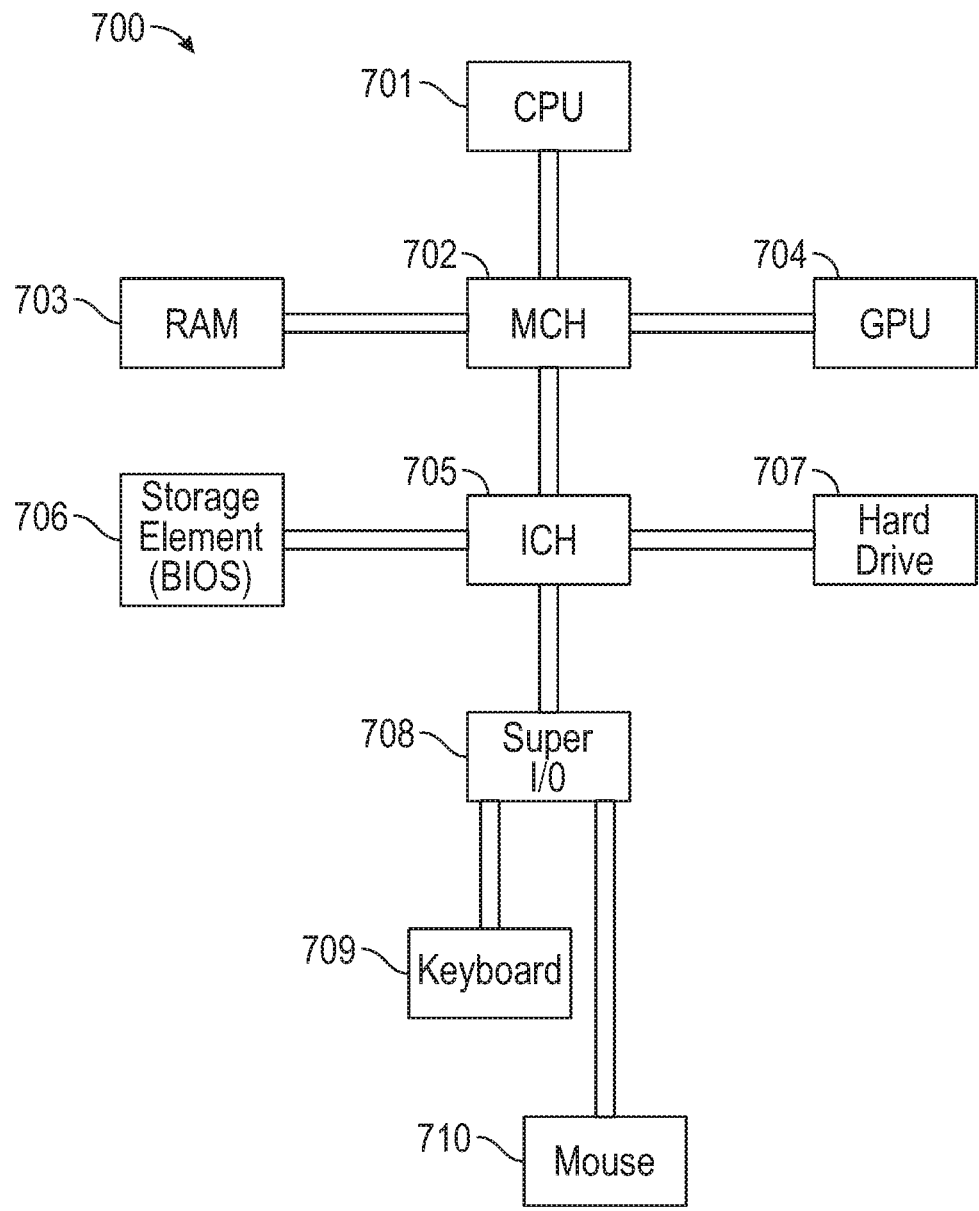
FIG. 7 depicts an example information handling system, according to one or more aspects of the present disclosure.

FIG. 7 is a diagram illustrating an example information handling system 700, according to one or more aspects of the present disclosure. The controller 222 may take a form similar to the information handling system 700. A processor or central processing unit (CPU) 701 of the information handling system 700 is communicatively coupled to a memory controller hub (MCH) or north bridge 702. The processor 701 may include, for example a microprocessor, microcontroller, digital signal processor (DSP), application specific integrated circuit (ASIC), or any other digital or analog circuitry configured to interpret and/or execute one or more instructions that cause the processor 701 to perform one or more steps and/or process data. Processor 701 may be configured to interpret and/or execute program instructions or other data retrieved and stored in any memory such as memory 703 or hard drive 707. Program instructions or other data may constitute portions of a software or application for carrying out one or more methods described herein. Memory 703 may include read-only memory (ROM), random access memory (RAM), solid state memory, or disk-based memory. Each memory module may include any system, device or apparatus configured to retain program instructions and/or data for a period of time (for example, computer-readable non-transitory media). For example, instructions from a software or application may be retrieved and stored in memory 403 for execution by processor 701.

Modifications, additions, or omissions may be made to FIG. 7 without departing from the scope of the present disclosure. For example, FIG. 7 shows a particular configuration of components of information handling system 700. However, any suitable configurations of components may be used. For example, components of information handling system 700 may be implemented either as physical or logical components. Furthermore, in some embodiments, functionality associated with components of information handling system 700 may be implemented in special purpose circuits or components. In other embodiments, functionality associated with components of information handling system 700 may be implemented in configurable general purpose circuit or components. For example, components of information handling system 700 may be implemented by configured computer program instructions.

Memory controller hub 702 may include a memory controller for directing information to or from various system memory components within the information handling system 700, such as memory 703, storage element 706, and hard drive 707. The memory controller hub 702 may be coupled to memory 703 and a graphics processing unit (GPU) 704. Memory controller hub 702 may also be coupled to an I/O controller hub (ICH) or south bridge 705. I/O controller hub 705 is coupled to storage elements of the information handling system 700, including a storage element 706, which may comprise a flash ROM that includes a basic input/output system (BIOS) of the computer system. I/O controller hub 705 is also coupled to the hard drive 707 of the information handling system 700. I/O controller hub 705 may also be coupled to a Super I/O chip 708, which is itself coupled to several of the I/O ports of the computer system, including keyboard 709 and mouse 710.

Figure 8:
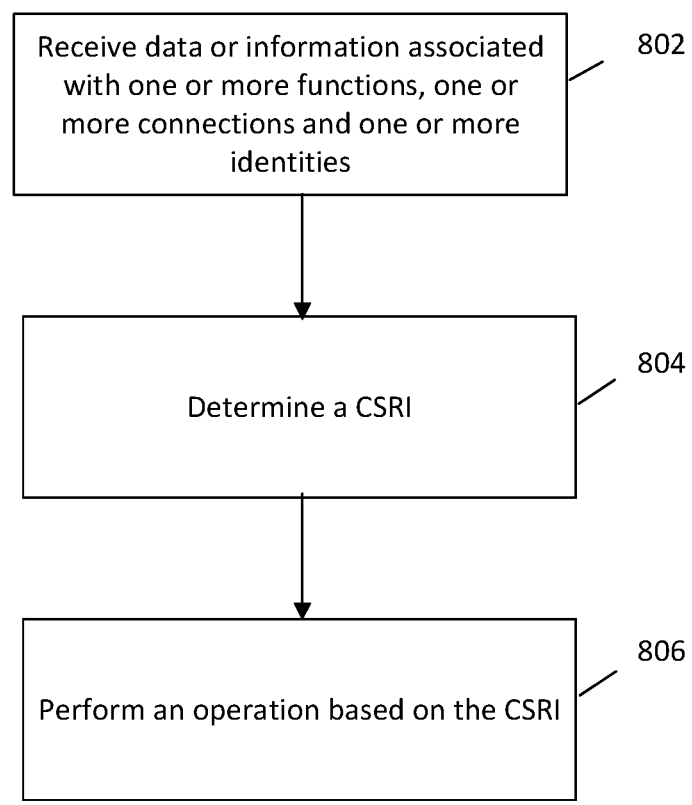
FIG. 8 illustrates a method for determining a cyber security risk index, according to one or more aspects of the present disclosure.

FIG. 8 illustrates a method for determining a cyber security risk index, according to one or more aspects of the present disclosure. At step 802, data or information associated with one or more functions, one or more connections and one or more identities associated with an asset environment or virtual asset is received. In one or more embodiments, the data or information may be received by a cyber security risk assessment module 180 of FIG. 1. The data or information may comprise the data or information discussed above with respect to FIGS. 4A, 4B, 5A, 5B, 6A and 6B. In one or more embodiments, the data or information may be received by the cyber security risk assessment module 180 from any one or more devices associated with the asset environment. For example, each device may report any one or more of one or more functions, one or more connections, one or more identities to the cyber security risk assessment module 180. In one or more embodiments, data or information associated with any one or more of one or more functions, one or more connections and one or more identities may be received by the cyber security risk assessment module 180 via any one or more interfaces, including, but not limited to an HMI.

At step 804, a CSRI is determined for an asset environment or a virtual asset. In one or more embodiments, a CSRI is determined as discussed above with respect to FIGS. 4A, 4B, 5A, 5B, 6A and 6C. In one or more embodiments, a CSRI is determined based, at least in part, on any one or more of Equations 1, 2, 3 and 4. For example, cyber security risk assessment module 180 may comprise an information handling system 700 of FIG. 7 that includes a memory and a processor where the memory comprises one or more instructions that when executed determine or cause the processor to determine a CSRI as discussed above.

At step 806, an operation or action is performed based, at least in part, on the CSRI. In one or more embodiments, an operation or action may comprise altering or adjusting a configuration of the virtual asset or asset environment, triggering an alert or communication, performing any one or more operations or actions, and any combination thereof based, at least in part on the CSRI. For example, an operation or action may comprise the cyber security risk assessment module 180 may activate or deactivate one or more connections, power-up or power-down one or more devices, reroute one or more communications via any one or more connections, allow or disallow access by one or more identities, perform any other operation or action and combination thereof.

In one or more embodiments, a method for determining a cyber security risk index associated with a virtual asset comprises determining one or more functions associated with the virtual asset, determining one or more connections associated with each function, determining one or more identities associated with each function, determining the cyber security risk index for the virtual asset based, at least in part, on the one or more functions, the one or more connections and the one or more identities and altering a configuration of the virtual asset based, at least in part, on the cyber security risk index. In one or more embodiments, the method further comprises wherein determining the one or more functions comprises determining a cardinality of each function set associated with a virtual asset, wherein each function set comprises at least one of the one or more functions and determining a function set connection type for each of the at least one of the one or more functions. In one or more embodiments, the method further comprises wherein determining the one or more connections comprises determining a number of invulnerable or protected connection points for each function set and determining a number of vulnerable connection points for each function set. In one or more embodiments, the method further comprises wherein determining the one or more identities comprises determining a number of trusted human identities that can access each function, determining a number of untrusted human identities that can access each function, determining a number of trusted devices that can access the function and determining the number of untrusted devices that can access the function. In one or more embodiments, the method further comprises determining a cyber security risk index associated with each of the one or more functions wherein determining the cyber security risk index for the virtual asset is further based, at least in part, on the cyber security risk index associated with each of the one or more functions. In one or more embodiments, the method further comprises associating a weight with at least one of the one or more functions, the one or more connections and the one or more identities. In one or more embodiments, the method further comprises triggering an alert based on the cyber security risk index. In one or more embodiments, a non-transitory computer-readable medium storing one or more instructions that, when executed by the process cause the processor to perform any one or more steps of the method. In one or more embodiments, an information handling system comprises a memory, a processor coupled to the memory, wherein the memory comprises one or more instructions executable by the processor to perform any one or more steps of the method.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present invention has been described with respect to specific details, it is not intended that such details should be regarded as limitations on the scope of the invention, except to the extent that they are included in the accompanying claims.

What is claimed is:

1. A method for determining a cyber security risk index associated with a virtual asset, comprising:
   determining one or more functions associated with one or more devices of the virtual asset;
   determining one or more connections associated with each function;
   determining one or more identities associated with each function;
   wherein determining the one or more functions comprises:
      determining a cardinality of each function set communicating with the virtual asset, wherein each function set comprises at least one of the one or more functions; and
      determining a function set connection type for each of the at least one of the one or more functions;
   determining the cyber security risk index for the virtual asset based, at least in part, on the one or more functions, the one or more connections, the one or more identities, the cardinality of each function set communicating with the virtual asset, and connection type of each function set; and
   altering a configuration of the virtual asset based, at least in part, on the cyber security risk index.

2. The method of claim 1, further comprising:
   wherein determining the one or more connections comprises:
      determining a number of protected connection points for each function set; and
      determining a number of vulnerable connection points for each function set.

3. The method of claim 2, further comprising:
   wherein determining the one or more identities comprises:
      determining a number of trusted human identities that can access each function;

determining a number of untrusted human identities that can access each function;
determining a number of trusted devices that can access the function; and
determining the number of untrusted devices that can access the function.

4. The method of claim 3, further comprising:
determining a cyber security risk index associated with each of the one or more functions; and
wherein determining the cyber security risk index for the virtual asset is further based, at least in part, on the cyber security risk index associated with each of the one or more functions.

5. The method of claim 1, further comprising associating a weight with at least one of the one or more functions, the one or more connections and the one or more identities.

6. The method of claim 1, further comprising triggering an alert based on the cyber security risk index.

7. A non-transitory computer-readable medium storing one or more instructions that, when executed by a processor, cause the processor to:
determine one or more functions associated with one or more devices of a virtual asset;
determine one or more connections associated with each function;
determine one or more identities associated with each function;
wherein determining the one or more functions comprises:
determining a cardinality of each function set communicating with the virtual asset, wherein each function set comprises at least one of the one or more functions; and
determining a function set connection type for each of the at least one of the one or more functions;
determine a cyber security risk index for the virtual asset based, at least in part, on the one or more functions, the one or more connections, the one or more identities, the cardinality of each function set communicating with the virtual asset, and the function set connection type; and
alter a configuration of the virtual asset based, at least in part, on the cyber security risk index.

8. The non-transitory computer-readable medium of claim 7, wherein determining the one or more connections comprises:
determining a number of protected connection points for each function set; and
determining a number of vulnerable connection points for each function set.

9. The non-transitory computer-readable medium of claim 8, wherein determining the one or more identities comprises:
determining a number of trusted human identities that can access each function;
determining a number of untrusted human identities that can access each function;
determining a number of trusted devices that can access the function; and
determining the number of untrusted devices that can access the function.

10. The non-transitory computer-readable medium of claim 9, wherein the one or more instructions when executed by the processor, further cause the processor to:
determine a cyber security risk index associated with each of the one or more functions; and
wherein determining the cyber security risk index for the virtual asset is further based, at least in part, on the cyber security risk index associated with each of the one or more functions.

11. The non-transitory computer-readable medium of claim 9, wherein the one or more instructions when executed by the processor, further cause the processor to associate a weight with at least one of the one or more functions, the one or more connections and the one or more identities.

12. The non-transitory computer-readable medium of claim 9, trigger an alert based on the cyber security risk index.

13. An information handling system comprising:
a memory;
a processor coupled to the memory, wherein the memory comprises one or more instructions executable by the processor to:
determine one or more functions associated with one or more devices of a virtual asset;
determine one or more connections associated with each function;
determine one or more identities associated with each function;
wherein determining the one or more functions comprises:
determining a cardinality of each function set communicating with the virtual asset, wherein each function set comprises at least one of the one or more functions; and
determining a function set connection type for each of the at least one of the one or more functions;
determine a cyber security risk index for the virtual asset based, at least in part, on the one or more functions, the one or more connections, the one or more identities, the cardinality of each function set communicating with the virtual asset, and the function set connection type; and
alter a configuration of the virtual asset based, at least in part, on the cyber security risk index.

14. The information handling system of claim 13, further comprising:
wherein determining the one or more connections comprises:
determining a number of protected connection points for each function set; and
determining a number of vulnerable connection points for each function set.

15. The information handling system of claim 14, further comprising:
wherein determining the one or more identities comprises:
determining a number of trusted human identities that can access each function;
determining a number of untrusted human identities that can access each function;
determining a number of trusted devices that can access the function; and
determining the number of untrusted devices that can access the function.

16. The information handling system of claim 15, wherein the one or more instructions are further executable by the processor to:
determine a cyber security risk index associated with each of the one or more functions; and
wherein determining the cyber security risk index for the virtual asset is further based, at least in part, on the cyber security risk index associated with each of the one or more functions.

17. The information handling system of claim 13, wherein the one or more instructions are further executable by the processor to associate a weight with at least one of the one or more functions, the one or more connections and the one or more identities.

18. The method of claim 1, wherein the virtual asset is associated with a maritime environment.

19. The method of claim 1, wherein altering the configuration of the virtual asset comprises activating or deactivating the one or more connections.

\* \* \* \* \*